United States Patent [19]  [11] 4,027,598
Swilley  [45] June 7, 1977

[54] STEPPING CONVEYOR

[75] Inventor: Wilson H. Swilley, Richmond, Calif.

[73] Assignee: The Cincinnati Butchers' Supply Company, Cincinnati, Ohio

[22] Filed: Oct. 3, 1973

[21] Appl. No.: 403,227

[52] U.S. Cl. .............................. 104/162; 198/473; 198/743

[51] Int. Cl.² ........................................ B61B 13/00

[58] Field of Search .......... 198/177 R, 177 T, 202, 198/218, 221; 104/162, 165

[56] References Cited

UNITED STATES PATENTS

| 3,013,506 | 12/1961 | Chill et al. | 104/162 |
|---|---|---|---|
| 3,265,192 | 8/1966 | Stadelman | 198/202 |
| 3,499,394 | 3/1970 | Lambert et al. | 104/162 |

Primary Examiner—Evon C. Blunk
Assistant Examiner—Joseph E. Valenza
Attorney, Agent, or Firm—J. Warren Kinney, Jr.

[57] ABSTRACT

The stepping conveyor comprises a walking beam which carries a plurality of trolley pushers or impellers adapted to advance, in one direction and in step by step fashion, a succession of trolleys that are movable along an overhead trolley rail; the walking beam incorporating structural improvements that minimize the cost of manufacture, of installation, and operation, and ensure a high degree of stability and resistance to wear in the walking beam system.

1 Claim, 5 Drawing Figures

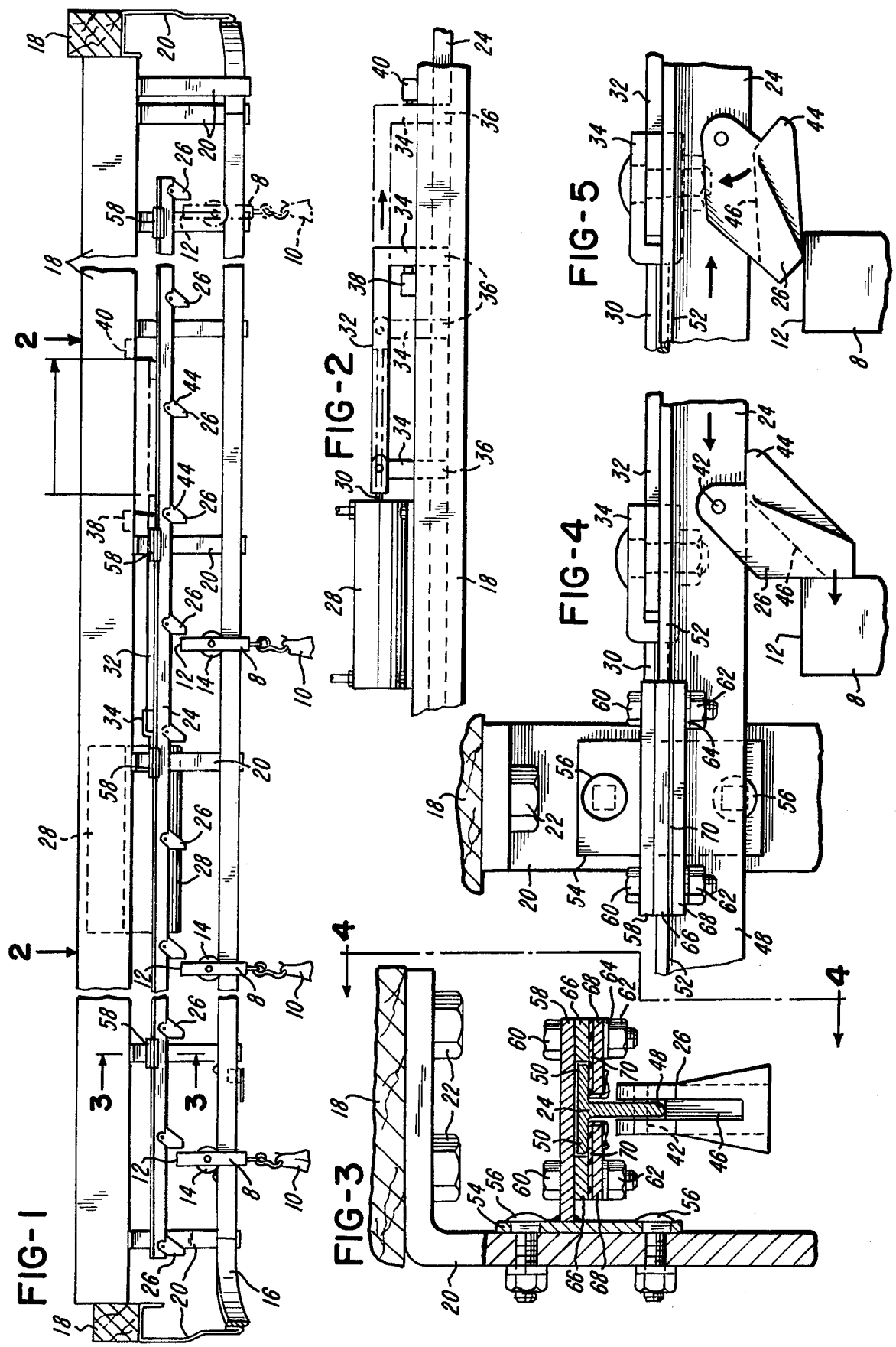

STEPPING CONVEYOR

DESCRIPTION OF THE PRIOR ART

The general idea of advancing and accumulating a succession of trolleys along an overhead rail in stepping fashion is disclosed by the U.S. Pats. of R. W. Lambert, et al, U.S. Pat. No. 3,499,394, and L. K. Adams, et al, U.S. Pat. No. 3,450,060. Both patents employ a so-called walking beam carrying a plurality of drop-fingers or pushers which act, upon reciprocation of the beam, to advance and space a succession of trolleys from which meat animals are suspended while undergoing processing.

Some objects of the present invention are: to enhance the operation of the walking beam structure, simplify it, and minimize manufacturing and installation expenses, as well as to improve structural stability and ease of lubrication to minimize wear of moving parts.

SUMMARY OF THE INVENTION

The walking beam in the present structure is a T-shaped member from which the pivoted drop-fingers or pushers are suspended. The T-member presents lower bearing surfaces which are flat and located at opposite sides of the web of the T-member. The bearing surfaces are adapted to rest upon parallel flat bearing plates which are spaced apart a distance exceeding the thickness of the web of the T-member, so that the weight of the T-member is balanced upon the plates equally at opposite sides of the web to preclude any tendency of the T-member to twist, while the web stabilizes the T-member against sagging.

To enhance slidability of the elongage T-member upon the stationary bearing plates, the plates at their bearing areas are covered or coated with an inherently slippery self-lubricating fluorocarbon material such as polytetrafluoroethylene or the like. This construction effects a saving of power and reduces noise and vibration. It may be noted also that the pivoted pushers or drop-fingers can move to and beyond the stationary bearing members upon reciprocation of the walking beam or T-member, without interference from the stationary bearing members, so as to expedite and facilitate installation of the conveyor, and eliminate the need for special pusher-suspending parts.

It is highly advantageous in many installations, to mount the stationary bearing means for the walking beam, upon the trolley rail hangers rather than upon the ceiling or the ceiling beams of a building, and the present structure realizes this advantage at no added cost.

BRIEF DESCRIPTION OF THE DRAWING

FIG. 1 is a side elevational view of a trolley rail section which includes the stepping conveyor means of the invention.

FIG. 2 is an enlarged top plan view of the same, taken on line 2—2 of FIG. 1.

FIG. 3 is an enlarged cross-section taken on line 3—3 of FIG. 1.

FIG. 4 is a side elevational view taken on line 4—4 of FIG. 3.

FIG. 5 is a fragmentary view of a portion of FIG. 4, showing displacement of a pusher resulting from shifting of the walking beam from left to right relative to a trolley harp.

DESCRIPTION OF THE PREFERRED EMBODIMENTS

In the drawing, the reference numerals 8 indicate generally a successsion of identical trolleys for suspending animal carcasses by their hind legs 10. Each trolley may comprise an inverted U-shaped body or harp 12, the legs of which support a trolley wheel 14 grooved peripherally to ride upon the upper edge of a trolley rail or track 16. The indicated section of track or rail 16 is a constituent of the stepping conveyor of the present invention, and is usually substantially horizontal and quite long so as to support and store many dozens of loaded trolleys accumulated thereon.

The primary purpose of the stepping conveyor is to sequentially advance and space loaded trolleys for economical storage, usually within a cool compartment, from which the suspended carcasses may be removed from time to time by further advancement of the trolleys in one direction.

A ceiling or a system of stationary ceiling beams 18 will usually suspend the rail 16 or any number of such rails, by way of a plurality of rail hangers 20 depending from the ceiling structure and bolted thereto as at 22. The lower ends of the hangers have fixed connection with the rail 16, usually close to the ceiling as shown.

The reference numeral 24 indicates a long straight walking beam, preferably in the form of a long rigid T-member, which is supported between the trolley rail and the ceiling structure in spaced substantial parallelism with the rail. The walking beam is supported at intervals along its length by a series of stationary bearing means later to be described in detail, and power means is provided for longitudinally reciprocating the walking beam relative to said bearing means. At predetermined spaced intervals along the length of walking beam 24, are located the pivoted pushers or drop-fingers 26 which act with each complete reciprocation of the walking beam, to advance a trolley one step in one direction along the trolley rail.

Repetitious reciprocation of the walking beam may be effected in any suitable manner, as by means of a fluid cylinder 28 having a piston rod 30 attached to a movable bridge member 32, whose legs 34, 34 are welded or otherwise fixed to the walking beam at 36, 36. Electric control switches 38 and 40 may serve to initiate a reversal of pressured fluid flow through the cylinder at each end of the stroke of the piston rod and bridge member 32, thereby to effect the desired reciprocation of the walking beam. Operation of the fluid cylinder may be terminated at any time, as desired, or upon deposit of a predetermined number of trolleys on rail 16.

It will be noted according to FIGS. 3, 4, and 5, that each pusher or drop-finger 26 has a pivotal connection at 42 upon the web of the walking beam, and carries a stop lug 44 to engage the lower edge of the T-member, as in FIG. 4, to limit rotation of the pusher in counterclockwise direction. A channel 46 in the pusher permits limited clockwise rotation of the pusher to the FIG. 5 position, at which the pusher may glide over the trolley frame or harp as the walking beam moves to the right on the idle stroke of the beam, without moving the trolley. However, on the reverse stroke of the beam, the pusher 26 according to FIG. 4 will be restrained by lug 44, to firmly engage and advance to the left, any trolley 12 in its path.

The manner in which the trolleys are advanced in step by step fashion, is explaned generally in the Adams, et al U.S. Pat. No. 3,450,060. The patent shows also, in FIG. 2, the need for a special extension 70 to avoid conflict with the adjacent bearing member 24 upon advancement of beam or rod 22, this being a condition which the present invention effectively eliminates in order to minimize labor and installation expense, and the cost of special parts.

Referring now to FIGS. 3 and 4, it is noted that the walking beam 24 of T-member cross-section includes the web 48 to which the pushers are pivoted, and a pair of flat coplanar flanges 50, 50 extending horizontally outwardly therefrom in opposite directions. The web is normal to the plane of the flanges, and depends vertically downward. Each of the flanges 50, 50 has an underface 52 which presents a bearing surface.

Each bearing means for support of the T-member may comprise a bracket base 54 to be bolted rigidly at 56 against an upright face of rail hanger 20, thereby to avoid the sometimes vexatious task of securing it to a ceiling which may vary in elevation or smoothness. A rigid horizontal support member 58 plate-like in form, extends from the base and is perforated to accommodate pairs of vertical bolts or fasteners 60. Each of said bolts carries a nut 62 and a washer 64.

Each pair of bolts 60 supports a spacer 66 which is slightly thicker than the T-member flange, and beneath each spacer is located a flat bearing plate 68 of sufficient strength and thickness to support the weight of the T-member or walking beam. In the preferred embodiment, the upper flat surface or bearing area of each bearing plate 68 carries a sheet or coating 70 of an inherently slippery self-lubricating fluorocarbon material such as polytetrafluoroethylene or the like. Bolts 60 may clamp the spacers, the bearing plates, and the sheets or coatings 70 into a lowfriction rigid bearing unit in which the walking beam may be reciprocated smoothly and noiselessly with a minimum expenditure of power. the walking beam is not subject to objectionable twisting that could cause disalignment with the trolley harps along the extent of the beam, and any tendency of the beam to sag is effectively overcome.

What is claimed is:

1. In a stepping conveyor of the type including a plurality of trolley rail hangers each having a substantially vertically disposed surface secured at one end to a ceiling structure and depending therefrom and secured at their other end to a horizontal trolley rail supporting the trolley rail is spaced relation to the ceiling structure, a plurality of work supporting trolleys supported on the trolley rail for movement therealong, and a reciprocating walking beam supported in substantially parallel relationship above the trolley rail and having a plurality of trolley engaging pushers for advancing and spacing trolleys in stepping manner along the trolley rail, the improvement comprising: a horizontally reciprocable walking beam of T-shaped cross-sectional configuration having a vertical web and a pair of substantially flat, coplanar flanges extending in opposite directions laterally from opposite sides of the upper edge of the web; and support means for the walking beam comprising a plurality of stationary walking beam support brackets each including a generally rectangularly shaped base bolted to and in parallel relationship with the vertical surface of the trolley rail hangers, a substantially horizontal, generally rectangularly shaped walking beam support plate welded at one edge thereof to said base and extending substantially perpendicularly therefrom, a pair of substantially flat, coplanar, laterally spaced apart bearing plates releasably secured relative to the underside of the support plate by bolts, a distance greater than the thickness of the flanges of the walking beam to preclude contact of the upper surfaces of said flanges with the lower surface of the support plate, and having coplanar upper bearing areas spaced below the support plate, spacers secured between the undersurface of the support plate and the bearing plates, and a strip of inherently slippery self-lubricating material on the bearing areas slidably supporting the undersurface of the flanges of the walking beam thereon with the web of the walking beam received in the space between the bearing plates, said strip including a first horizontal portion overlying the upper surface of a bearing plate and extended between the bearing plate and spacer associated therewith, a vertical portion extended downwardly across the inner edge of the bearing plate, and a second horizontal portion extended a limited distance rearwardly beneath the bearing plate, bolt means extended through the bearing plates, strips of slippery material, spacers and support plates, securing them together, and means associated with the walking beam to reciprocate it to advance trolleys along the trolley rail in stepping manner and in a common direction.

* * * * *